(12) United States Patent
Robbin (10) Patent No.: US 6,731,312 B2
(45) Date of Patent: May 4, 2004

(54) MEDIA PLAYER INTERFACE

(75) Inventor: Jeff Robbin, Los Altos, CA (US)

(73) Assignee: Apple Computer, Inc., Cupertino, CA (US)

( * ) Notice: Subject to any disclaimer, the term of this patent is extended or adjusted under 35 U.S.C. 154(b) by 325 days.

(21) Appl. No.: 09/757,000

(22) Filed: Jan. 8, 2001

(65) Prior Publication Data

US 2002/0089529 A1 Jul. 11, 2002

(51) Int. Cl.$^7$ ................................ G09G 5/00
(52) U.S. Cl. ............... 345/792; 345/716; 345/781; 345/855
(58) Field of Search ............... 345/716–717, 345/727, 781, 783, 792, 810, 804, 853–855; 84/609

(56) References Cited

U.S. PATENT DOCUMENTS

| | | | |
|---|---|---|---|
| 5,864,868 A | | 1/1999 | Contois |
| 5,969,283 A | | 10/1999 | Looney et al. |
| 6,088,649 A | * | 7/2000 | Kadaba et al. ............ 701/201 |
| 6,118,450 A | | 9/2000 | Proehl |
| 6,248,946 B1 | | 6/2001 | Dwek |
| 6,317,784 B1 | * | 11/2001 | Mackintosh et al. ........ 709/219 |
| 6,346,951 B1 | * | 2/2002 | Mastronardi ............... 345/716 |
| 6,374,177 B1 | * | 4/2002 | Lee et al. ................... 701/200 |
| 6,380,947 B1 | * | 4/2002 | Stead ......................... 345/645 |
| 6,564,213 B1 | * | 5/2003 | Ortega et al. ............... 707/5 |

FOREIGN PATENT DOCUMENTS

WO    WO 02/080176 A2   *   10/2002       G11B/27/034

OTHER PUBLICATIONS

WINAMP from Nullsoft (screendumps of the media player having visual effect, version 2.62, 2000, p. 2).*
Microsoft Knowledge Base Article–324594 (Support Web-Cast: Windows Media Player 7: New features and Walk-through, Jul. 2000).*
Microsoft Press Pass (Microsoft Unveils Windows Media Player 7, p. 4, Mar. 2000).*
Microsoft Press Pass (Microsoft Popularity of Microsoft Windows Media Player 7, p. 1, Aug. 2000).*
Microsoft Support Webcasts (Windows Media Player 7: New features and Walk–through Slide Show, p. 20, Jul. 2000).*
Microsoft Support Webcasts (Windows Media Player 7: New features and Walk–through Transcript, p. 7, Jul. 2000).*
MicroSoft Windows Media Player Visualization Screendumps (p. 2).*
Irfan View Screen Dumps (IrfanView Help, 1999).*

* cited by examiner

*Primary Examiner*—Sy D. Luu
(74) *Attorney, Agent, or Firm*—Burns, Doane, Swecker & Mathis, L.L.P.

(57) ABSTRACT

A computer readable medium contains media player application code which implements the procedures of generating in a user interface an application window having a window frame and a plurality of stiles to define a plurality of panes within said frame, displaying in a first one of said panes a user selectable index of a plurality of media files, displaying in a second one of said first selected information for said media files, and displaying in a third one of said panes second selected information for said media files.

71 Claims, 11 Drawing Sheets

MEDIA PLAYER INTERFACE

BACKGROUND OF THE INVENTION

1. Field of the Invention

The present invention relates to graphic user interfaces for computer application programs, and more particulary to a graphic user interface for a medial player on a personal computer or similar user device.

2. Description of the Related Art

Graphical users interfaces for media players are well known. Such interfaces typically provide a computer generated image that simulates a control panel of a hardware media player. In addition, the computer generated image may also include information not generally accessible in a hardware player. For example, the computer generated image may include an index of media files whose content is capable of being read by the media player. The index is generated by the media player usually by reading the entries of one or more directories of an operating system file system within a user computer. The media player may search all such directories such that only file types having an extension readable by the media player are displayed.

SUMMARY OF THE INVENTION

According to the present invention, a computer readable medium contains media player application code which implements the procedures of generating in a user interface an application window having a window frame and a plurality of stiles to define a plurality of panes within said frame, displaying in a first one of said panes a user selectable index of a plurality of media files, displaying in a second one of said first selected information for said media files, and displaying in a third one of said panes second selected information for said media files.

In one embodiment of the present invention, a user selectable browse button may be displayed in the frame such that the user may toggle the window between displaying all of the panes, and only the pane containing the index of the media files. In another embodiment, a fourth pane displays an index of all the sources for the media files. A feature of this embodiment is that a single user selectable button displayed with te frame may change states in accordance with the particular source of media files selected. In still another embodiment, the frame may contain a user accessible search box. As the user enters each character into the search box, the content of each of the panes is automatically updated to reflect only those entries of the index which match the search character string. In yet another embodiment, a user selectable button allows the window to toggle between display of the panes and a visual effect to accompany the presentation of the content of the media files.

These and other objects, advantages and features of the present invention will become readily apparent to those skilled in the art from a study of the following Description of the Exemplary Preferred Embodiments when read in conjunction with the attached Drawing and appended claims.

DESCRIPTION OF THE EXEMPLARY PREFERRED EMBODIMENTS

Referring now to FIGS. 1–10, there is shown an application window 10 having a window frame 12 and a plurality of stiles 14 to define a plurality of panes 16 within the frame 12. In a preferred embodiment of the present invention, the window 10 may be generated in a user interface, such as a monitor 18 of a computer 20, as seen in FIG. 11. The computer 20 contains a computer readable medium, such a disk 22, which contains an application code, such as a media player. The code, when executed, would then generate the application window 10 and implement the following described procedures.

Figure 1:
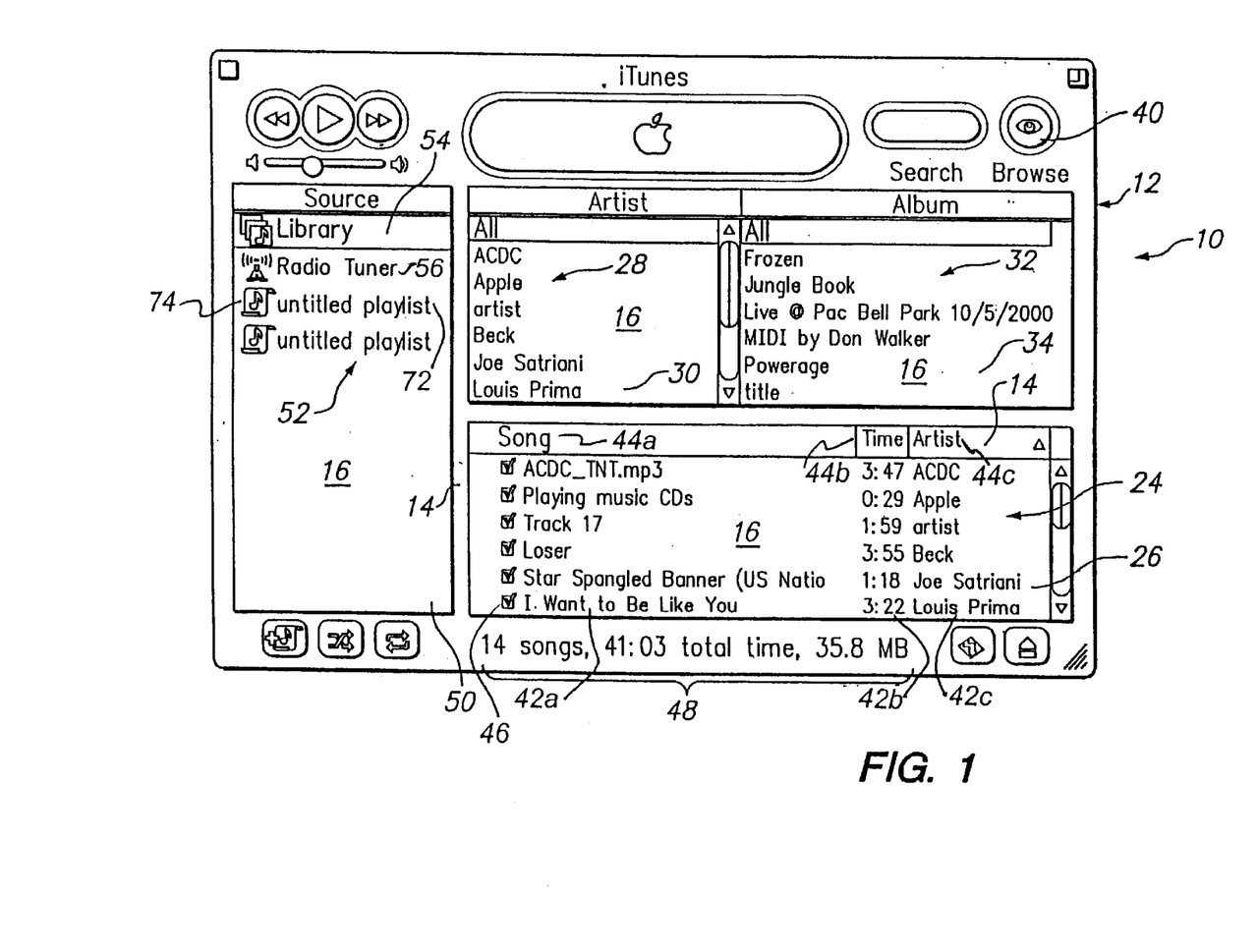
FIGS. 1–10 are representative of a graphic user interface of a media player in accordance with the present invention.

As best seen in FIG. 1, an index 24 of a plurality of media files is displayed in a first one 26 of the panes 16, first selected information 28 for the media files is displayed in a second one 30 of the panes 16 and second selected information 32 for the media files is displayed in a third one 34 of the panes 16. In one exemplary embodiment of the present invention, the first selected information 28 is an index of a plurality of artists associated with each of the media files, and the second selected information 32 is an index of a plurality of albums associated with each of the media files. Each of the artist and album indices may further be selectable by a user of the computer 20 through its user interface to limit, respectively, the display of the index 24 of the media files to selected ones of the media files associated with the selected one of said artists, or to selected ones of the media files associated with one of the albums. It is to be understood that the term user interface as used herein may also include, as required to perform the procedures set forth herein, a keyboard 36 or mouse 38, as best seen in FIG. 11.

Figure 2:
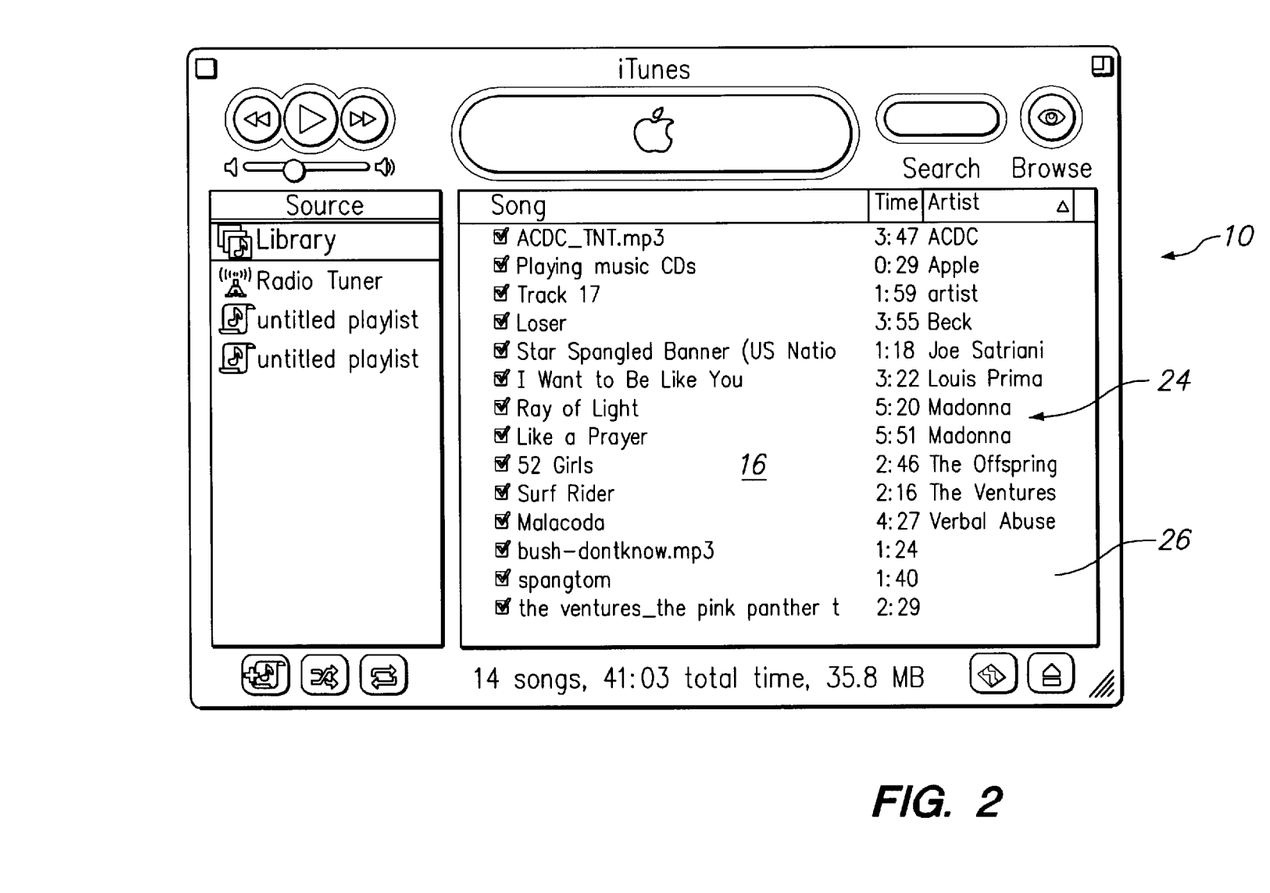

In accordance with one exemplary embodiment of the present invention, a browse button 40a, selectable through the user interface, may be displayed. Selecting the browse button 40a toggles the window 10 between all of the panes 16 being displayed and only a selected one of the panes 16 being displayed. For example, the selected one of the panes 16 may be the first one 26 of the panes 16. As best seen in FIG. 2, only the selected one of the panes 16 is displayed in the window 10 in lieu of the other ones of the panes 16 when the window is toggled.

As best seen in FIG. 1, the index 24 of the media files includes columnar categories 42a, 42b, 42c for each of the media files. As is known, the index 24 is sortable by each of the categories 42a, 42b, 42c. To implement such sorting, a plurality of heading buttons 44a, 44b, 44c, associated with a respective one of the categories 42a, 42b, 42c, may be displayed. Each of the heading buttons 44a, 44b, 44c are selectable through the user interface, such as by using the mouse 38 to place a cursor over the desired button and then performing a mouse click, to sort the index 24 by the respective one of the categories 42a, 42b, 42c.

In another embodiment of the present invention, the index 24 may further include a plurality of check boxes 46 also selectable through the user interface. As best seen in FIG. 1, each of the check boxes is associated with a respective one of each of the media files in the index 24. Status information 48 concerning the media files for which the associated one of the check boxes 46 has been selected may further be displayed in a selected portion of the frame 12.

In addition to the hereinabove described panes 16, a fourth one 50 of the panes 16 may contain information relating to a plurality of selectable sources 52 for the media files. For example, a first one 54 of the sources 52 may be a library source of all or selected ones of the media files stored in the disk 22 of the computer 20. In accordance with one embodiment of the present invention, when the library source is selected the first one 26, the second one 30 and the third one 34 of the panes 16 are displayed.

Figure 3:
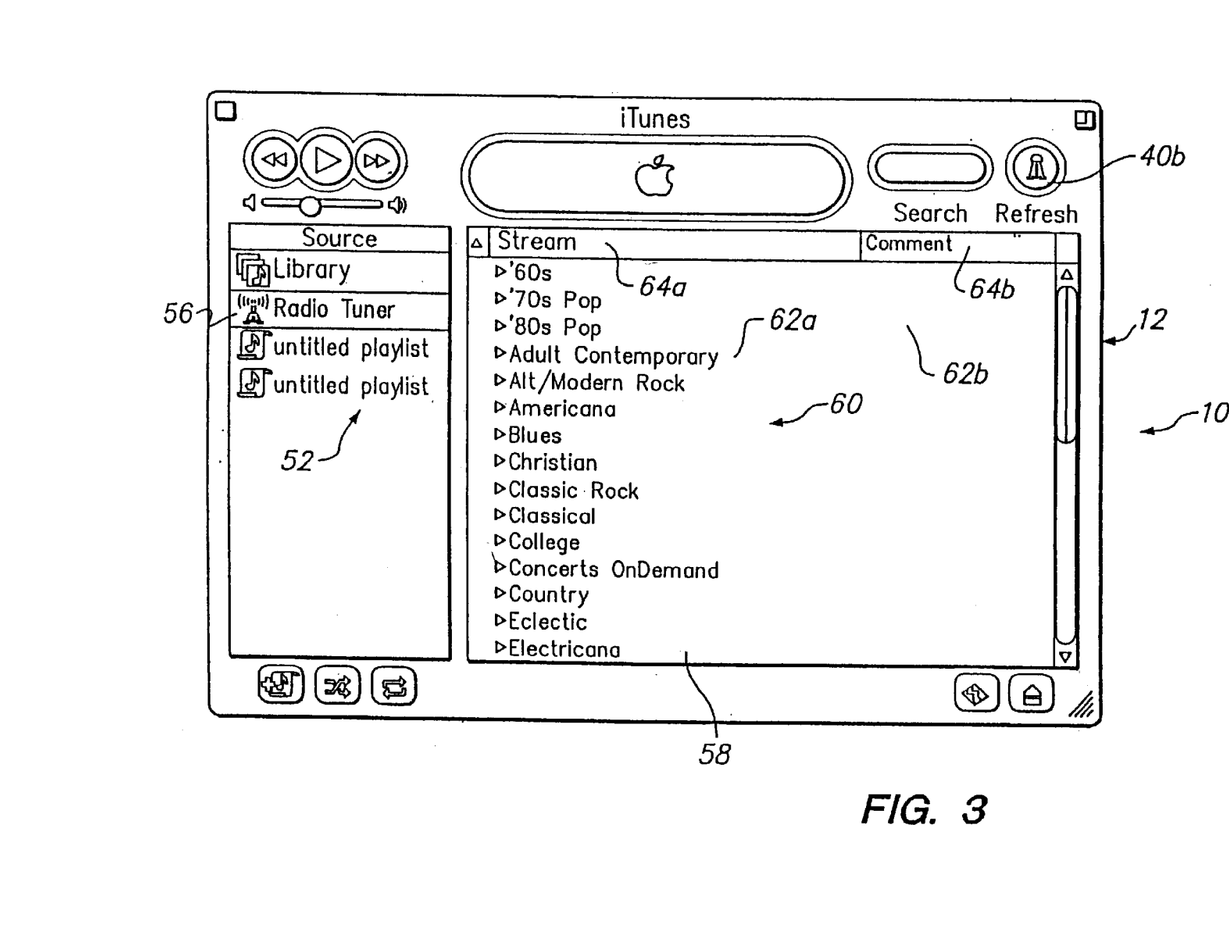

A second one 56 of the sources 52 may include a radio tuner. As best seen in FIG. 3, when the radio tuner is selected through the user interface, a fifth one 58 of the panes 16 is displayed in lieu of said first, second and third ones of said panes. The fifth one 58 of the panes 16 includes an index 60 of genre of the media files. Similarly as described hereinabove, the index 60 of genre may also include columnar categories 62a, 62b for each of the genre of the media files, and such categories 62a, 62b may also be sortable by each of these categories 62a, 62b. Accordingly, a heading button 64a, 64b, for each respective one of the categories 62a, 62b may be displayed in the fifth one 58 of the panes 16. Each of the heading buttons 64a, 64b are selectable through the user interface to sort the index 60 of genre by the respective one of the categories 62a, 62b.

As also seen in FIG. 3, user selectable refresh button 40b may also be displayed in the frame 12 when the radio tuner has been selected. Selection of the refresh button 40b connects the user computer 20 to the Internet 66, as best seen in FIG. 11, to obtain refreshed information for the media files, such as from a file server 68 or an Internet radio 70, and update the index 60 of genre as needed. In one embodiment of the present invention, the browse button 40a described in conjunction with FIGS. 1–2, and the refresh button 40b may be the same button which changes states and icons in accordance with the selection of one of the sources 52, as described in commonly owned, copending application Ser. No. 09/757,109 filed on Jan. 8, 2001, which is incorporated herein by reference.

Figure 4:
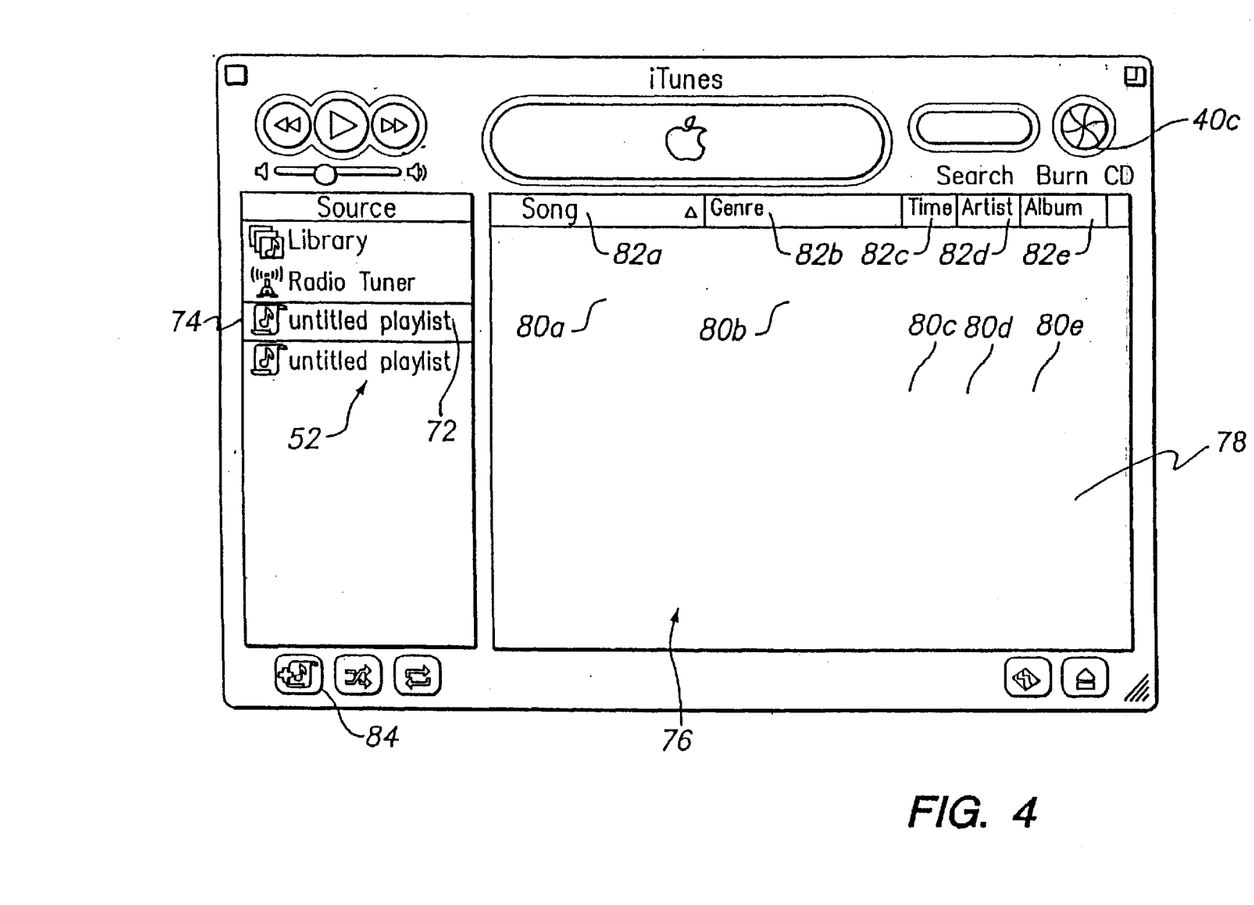

In another embodiment of the present invention, a third one 72 of the sources 52 may include a user definable playlist. Selected ones of the media files may be added to the playlist by dragging and dropping through the user interface from the index 24 of the media files to an icon 74 for the playlist in the fourth one 50 of the panes 16, as is known in the art. As best seen in FIG. 4, when the playlist icon 74 is selected, an index 76 of media files contained in the selected playlist is displayed in a sixth one 78 of the panes 16 in lieu of the first one 26, the second one 30 and the third one 34 of the panes 16 (FIG. 1).

Similarly as described hereinabove, the index 76 of the selected playlist may also include columnar categories 80a–e for each of the media files contained in the playlist. Each of the categories 80a–e may also be sortable. Accordingly, a plurality of heading buttons 82a–e for each respective one of the categories 80a–e for the index 76 of the selected playlist are selectable through the user interface to sort this index 76.

As best seen in FIG. 4, when a playlist is selected, a burn CD button 40c may also be displayed in the frame 12. Selecting through the user interface of the burn CD button 40c initiates a further procedure allowing media files indicated in said selected playlist to be recorded onto a compact disk. Also as described hereinabove, the burn CD button 40c may be the same as the browse button 40a described in conjunction with FIGS. 1–2, and the refresh button 40b described in conjunction with FIG. 3 which changes states and icons in accordance with the selection of one of the sources 52, as described in the hereinabove referenced application.

In another embodiment of the present invention, a user selectable button 84 in a selected portion of the frame may also be displayed. Selecting of the button 84 through the user interface causes a new user definable playlist to be added to the sources 52.

Figure 5:
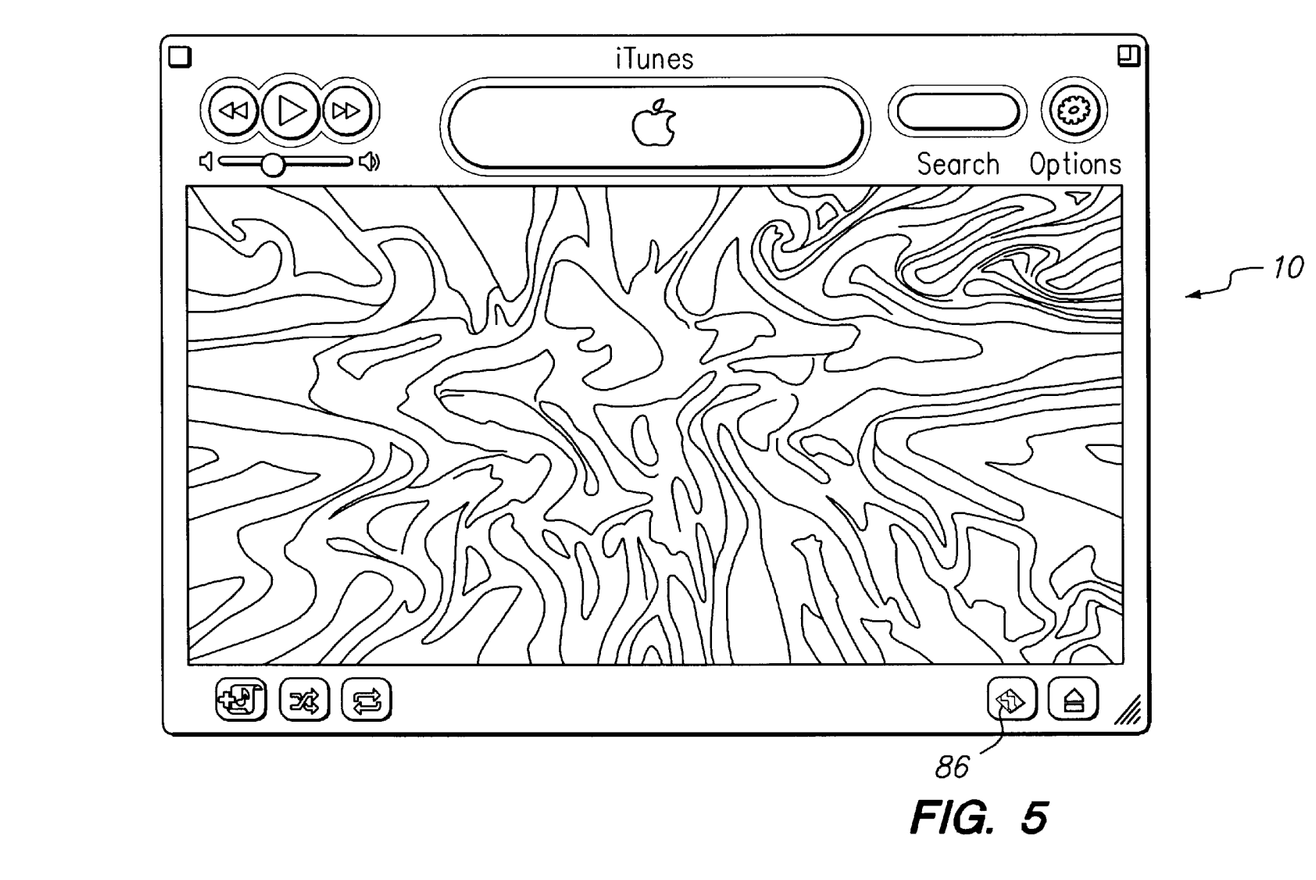

As best seen in FIG. 5, another user selectable button 86 may be displayed in the frame 12. Selection of this button 86 may develop a visual effect in the window 10 in lieu of the panes 16. The visual effect may be developed responsive to at least one parameter of one of the media files while used by the media player.

Referring now to FIGS. 6–9, a search box 88 may be disposed in a selected portion of the frame 12. In this embodiment of the present invention, the search box is adapted to receive through the user interface successive characters of a search term or search string. As each one of the characters of the search string are entered, the index 24 of the media filed is automatically searched. In response to the search being performed, the index 24 of the media files is refreshed such that only selected ones of the media filed in the index 24 that match the successive ones of said characters are displayed.

Figure 6:
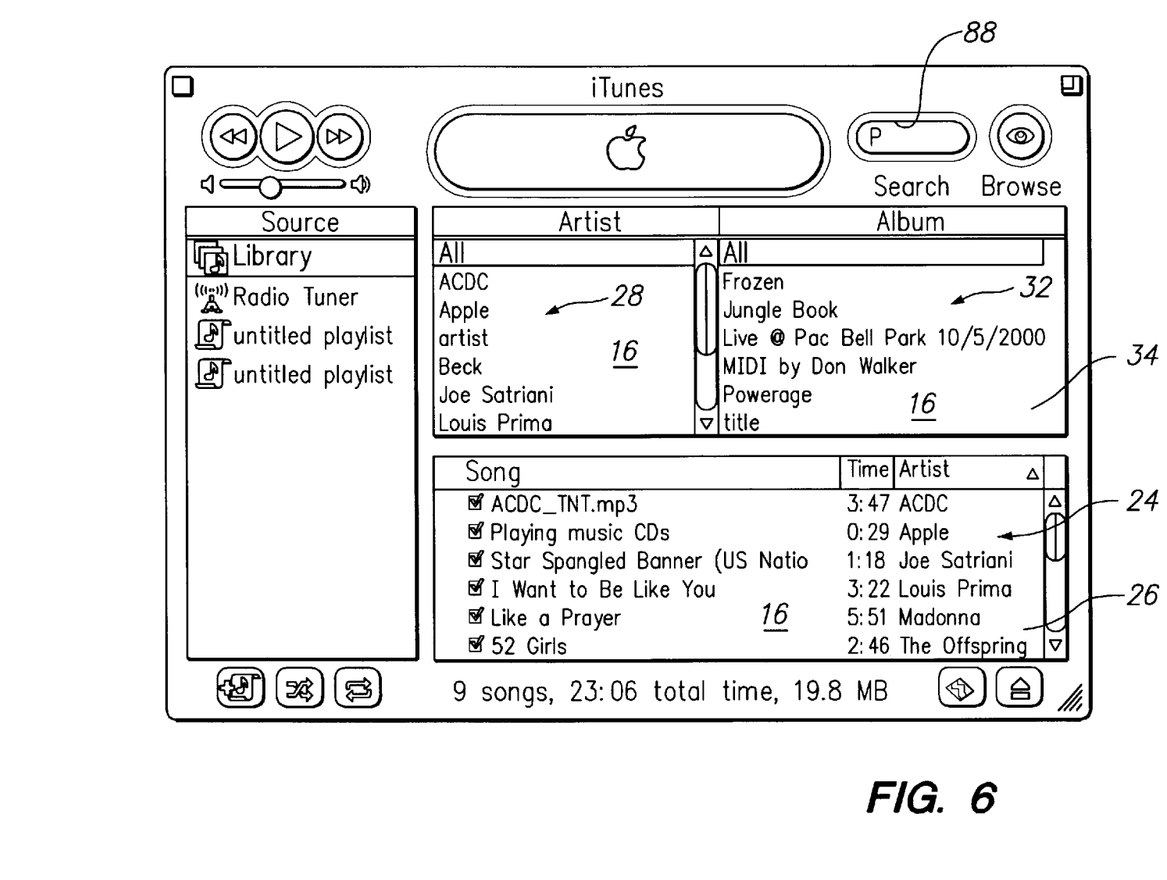
Figure 7:
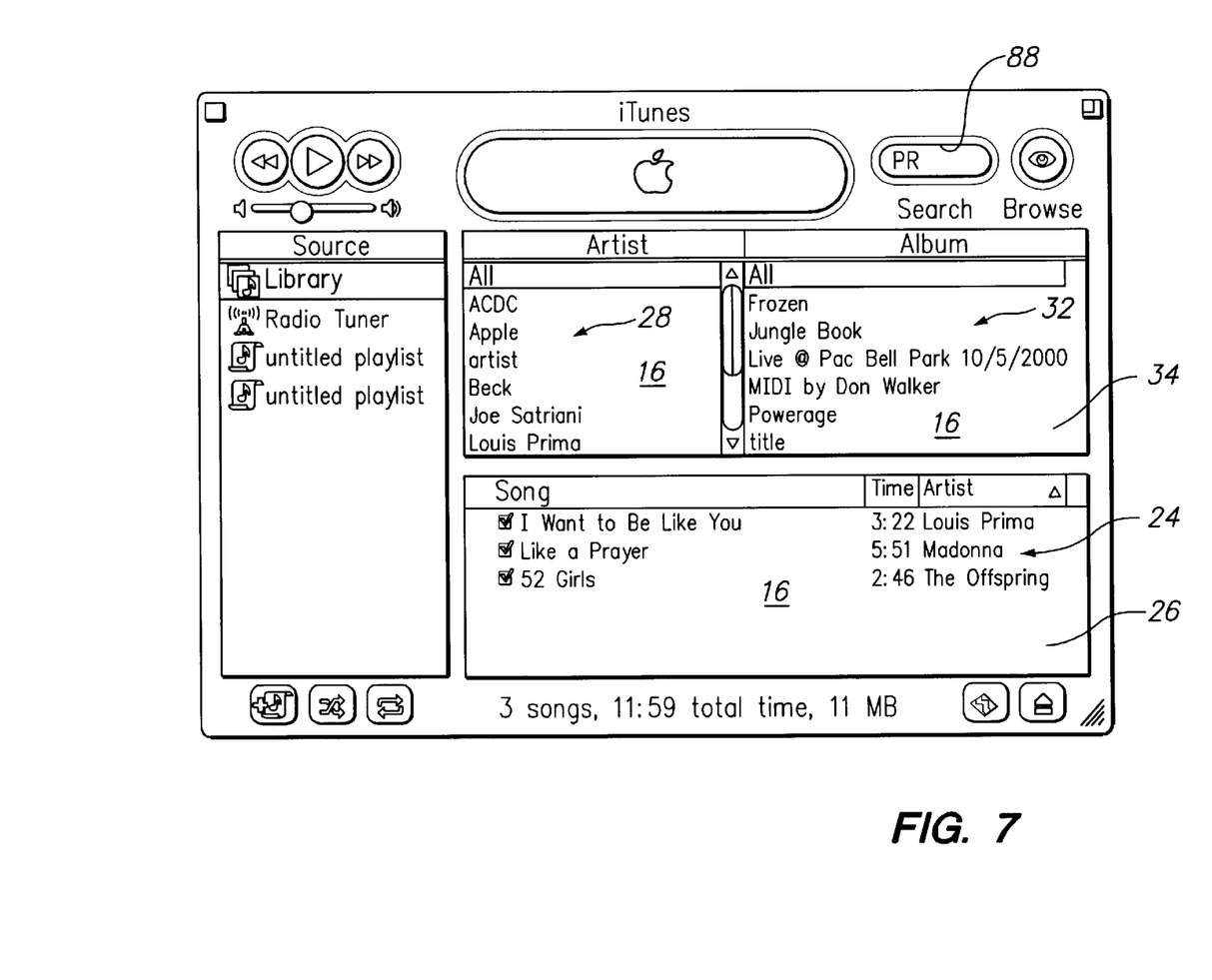
Figure 8:
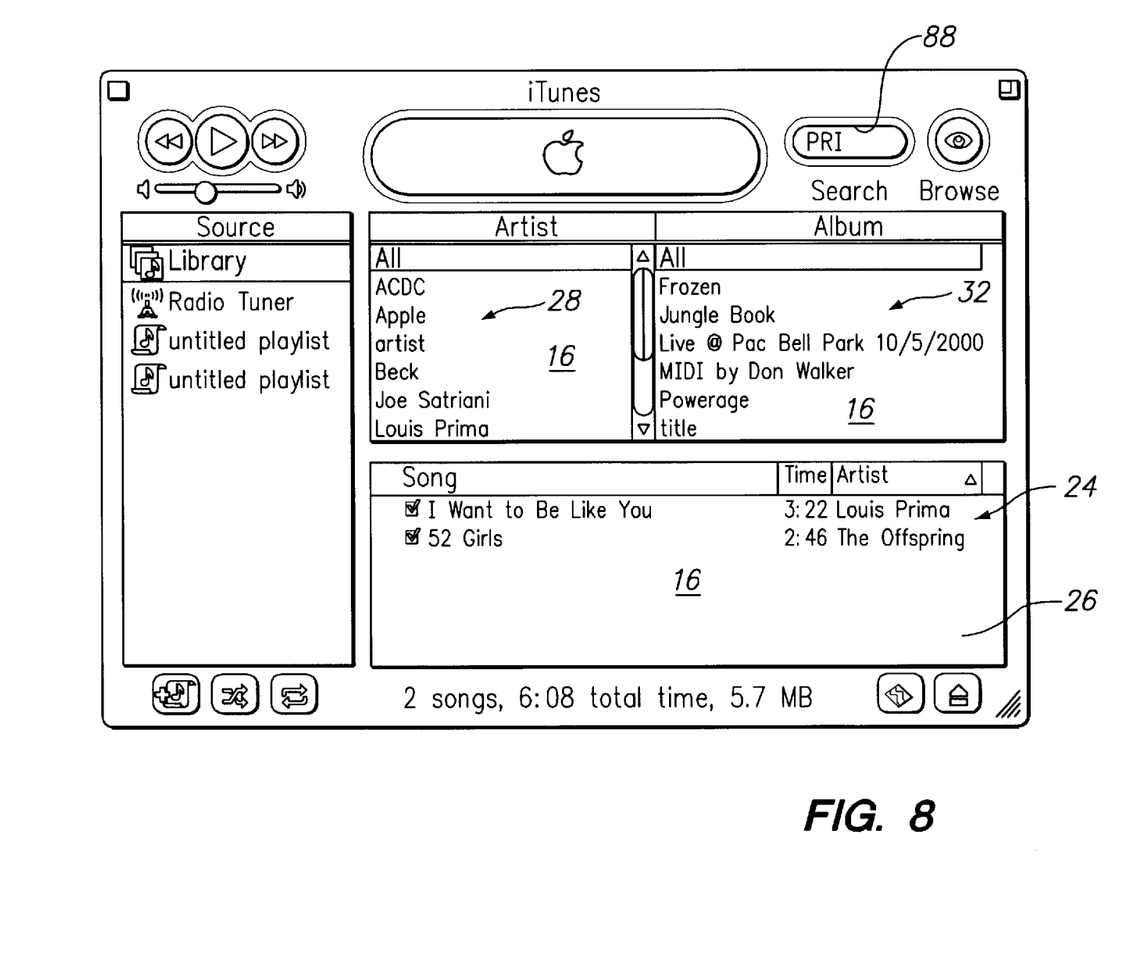
Figure 12:
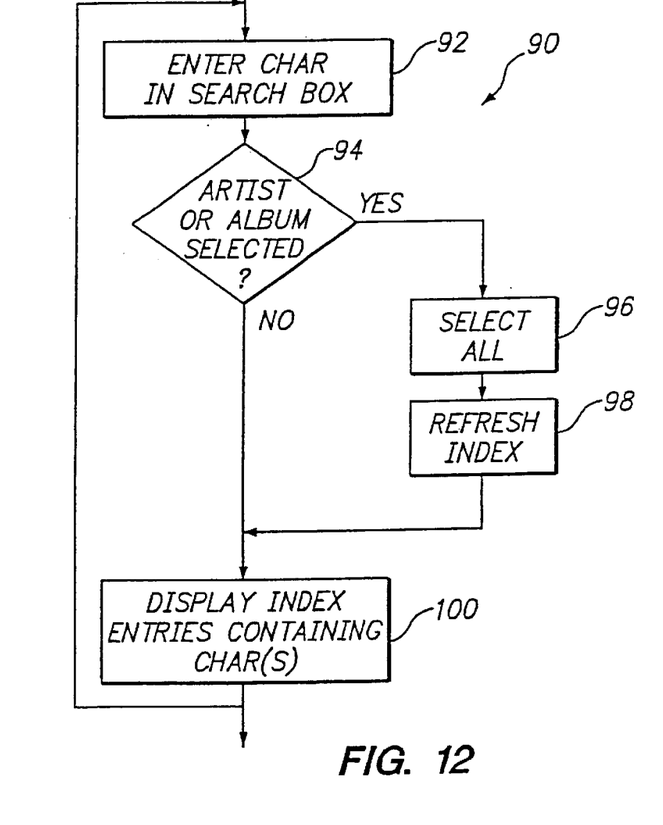
FIG. 12 is a flow chart useful to describe a search function of the user interface of the present invention.

In further reference to the flow chart 90 of FIG. 12, a search character is entered into the search box 88, as indicated 92. For example, as seen in FIG. 6, the character "p" may be entered into the search box 88. A query is made to determine if an artist or album has heretofore been selected, as indicated at 94. If yes, then the "All" selection of the artist and album is automatically selected, as indicated at 96, so that the index 24 may be refreshed, as indicated at 98, so that the entire index 24 is searched for this character, instead of the limited selected index 24 as described above when an artist or album had been selected. Upon the character "p" being entered, the index 24 is then displayed, as indicated at 100, to contain only those media files which contain this search character. Also as seen in FIG. 6, the status information 48 is also refreshed indicating that fewer media files are now selected.

Figure 9:
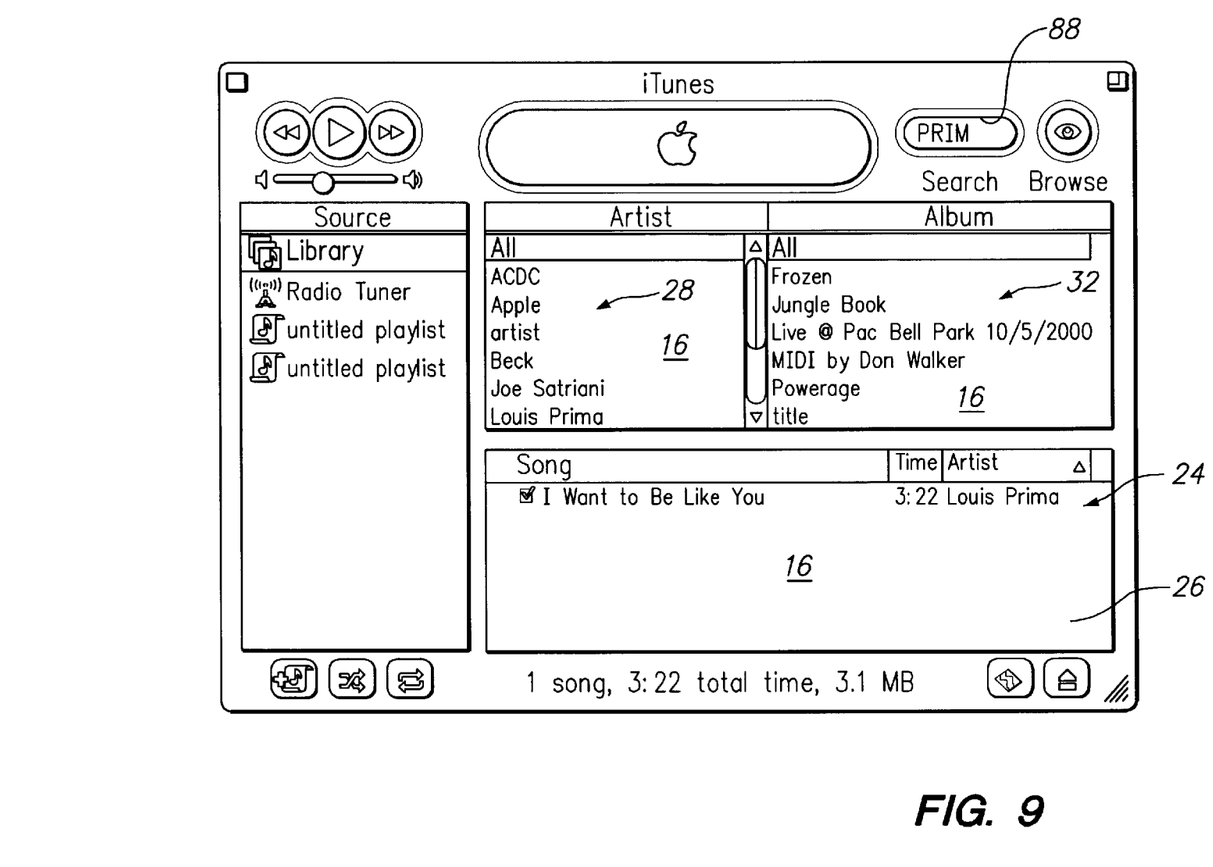

The flow process of FIG. 12 repeats for each subsequent character entered into the search box 88. Progressively in FIGS. 7–9, the characters "r", "i" and "m" are appended to the search string. In each of FIGS. 7–9, it is clearly shown that the index 24 of the media files becomes successively more limited, and the status information 88 also further refreshed, until only one match remains, as seen in FIG. 9.

Figure 10:
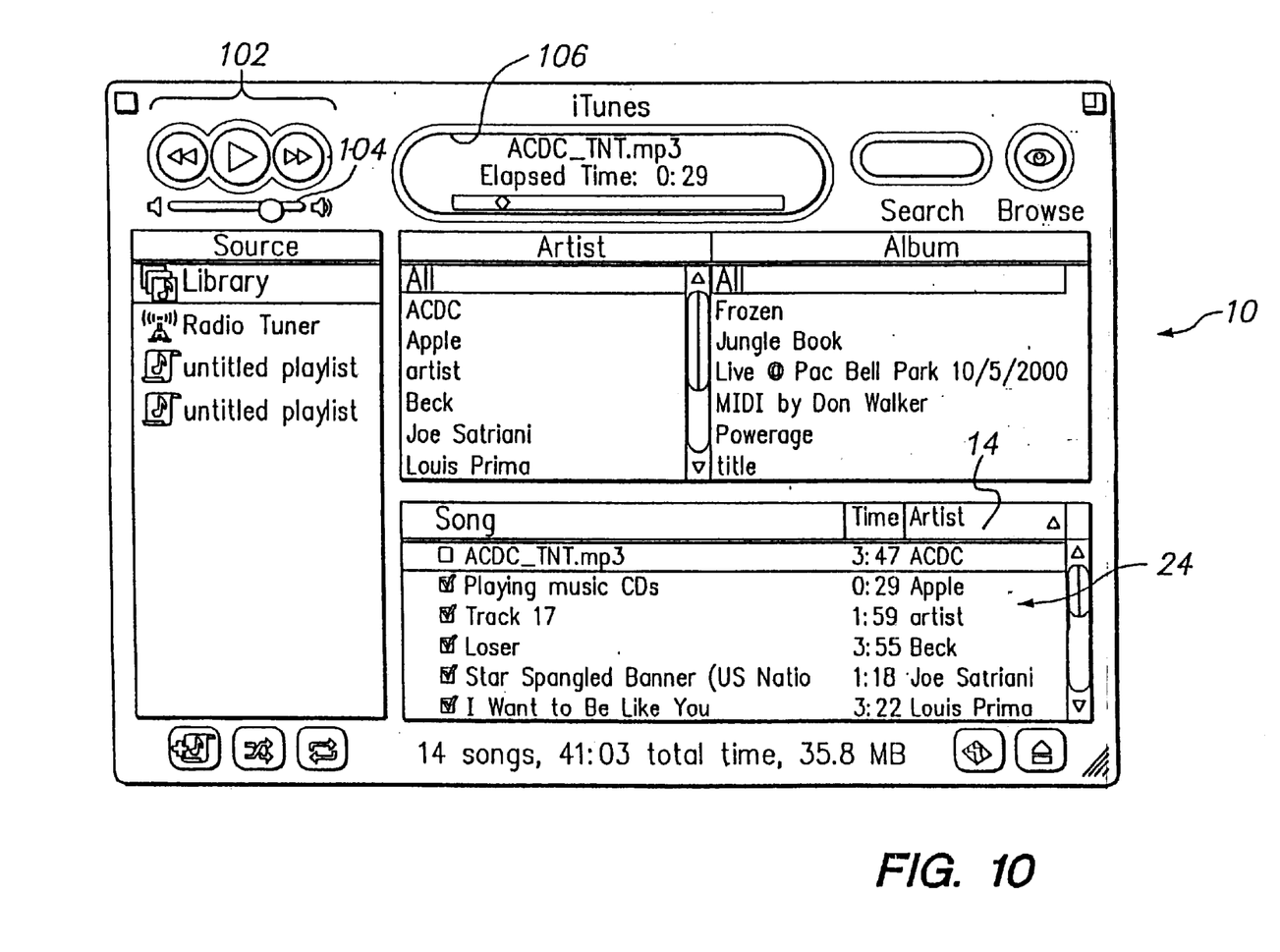
Figure 11:
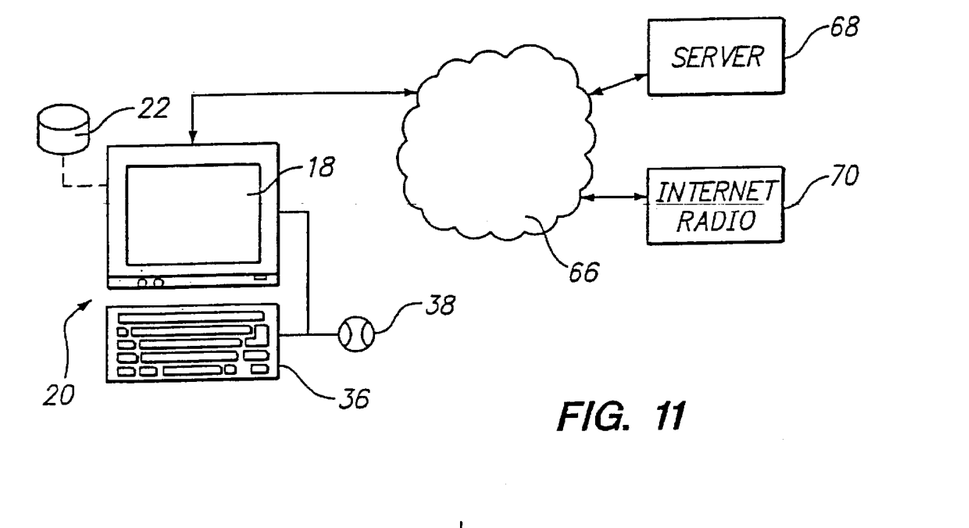
FIG. 11 is a schematic block diagram of a network system useful in practicing one aspect of the present invention.

With reference to FIG. 10, a plurality of user selectable control buttons 102 may be disposed in a selected portion of the frame 12. As is conventionally known, the control buttons 102 control execution of the media player, such as play, fast forward and fast reverse, when calling content from the media files in said index 24. Furthermore the media player may only call content from only user selected ones of the media files, such as through selection of the check boxes 46. At least one user selectable slider 104 in association with the control buttons 102 may also be displayed. The slider 104 controls at least one parameter of content of the media files, such as volume. A status pane 106 may also be displayed in a selected portion of the frame 12. The status pane 106 displays status of content of one of the media files when called by the media player. The stiles 14 are movable in the window 10 to change selectively through the user interface dimensions of the panes 16.

There has been described hereinabove exemplary preferred embodiments of a graphic user interface for a media player. Those skilled in the art may now make numerous uses of, and departures from, the hereinabove described exemplary preferred embodiments without departing from the inventive concepts disclosed herein. Accordingly, the present invention is to be described solely by the scope of the appended claims.

What is claimed as the invention is:

1. A computer readable medium comprising media player application code which implements the following procedures:
   generating in a user interface an application window having a window frame and a plurality of stiles to define a plurality of panes within said frame;
   displaying in a first one of said panes a user selectable index of a plurality of media files;
   displaying in a second one of said panes first selected information for said media files; and
   displaying in a third one of said panes second selected information for said media files
   wherein said second and third panes are each initialized with a selection to view all of said user selectable index of the plurality of media files in said first pane.

2. A computer readable medium as set forth in claim 1 wherein said displaying said first selected information includes displaying an index of a plurality of artists associated with said media files.

3. A computer readable medium as set forth in claim 2 wherein selecting through said user interface one of said artists limits display of said index to selected ones of said media files associated with said one of said artists.

4. A computer readable medium as set forth in claim 1 wherein said displaying said second selected information includes displaying all index of a plurality of albums associated with said media files.

5. A computer readable medium as set forth in claim 4 wherein selecting through said user interface one of said albums limits display of said index to selected ones of said media files associated with said one of said albums.

6. A computer readable medium as set forth in claim 1 further comprising displaying a browse button in said frame wherein selecting said button through said user interface toggles said window between all of said panes being displayed and only a selected one of said panes being displayed.

7. A computer readable medium as set forth in claim 6 wherein said selected one of said panes is said first one of said panes.

8. A computer readable medium as set forth in claim 6 wherein said selected one of said panes is displayed in said window in lieu of the other ones of said panes when said window is toggled to display only said selected one of said panes.

9. A computer readable medium as set forth in claim 1 wherein said stiles are movable in said window to change selectively through said user interface dimensions of said panes.

10. A computer readable medium as set forth in claim 1 wherein said index includes columnar categories for each of said media files.

11. A computer readable medium as set forth in claim 10 wherein said index is sortable by each of said categories.

12. A computer readable medium as set forth in claim 11 further comprising displaying a plurality of heading buttons for each respective one of said categories wherein each of said heading buttons are selectable through said user interface to sort said index by said respective one of said categories.

13. A computer readable medium as set forth in claim 1 wherein said index further includes a plurality of check boxes selectable through said user interface, each of said check boxes being associated with a respective one of each of said media files in said index.

14. A computer readable medium as set forth in claim 13 further comprising displaying in a selected portion of said frame, status information concerning said media files for which said associated one of said check boxes has been selected.

15. A computer readable medium as set forth in claim 1 further comprising displaying in a fourth one of said panes information relating to a plurality of selectable sources for said media files, a first one of said sources being a library source which when selected causes said first, second and said third ones of said panes to be displayed.

16. A computer readable medium as set forth in claim 15 wherein a second one of said sources includes a user definable playlist.

17. A computer readable medium as set forth in claim 16 further comprising adding selected ones of said media files to said playlist by dragging and dropping through said user interface from said index to an icon for said playlist in said fourth one of said panes.

18. A computer readable medium as set forth in claim 17 further comprising displaying in a fifth one of said panes an index of media files contained in said playlist when said playlist has been selected, said fifth one of said panes being displayed in lieu of said first, second and third ones of said panes.

19. A computer readable medium as set forth in claim 18 wherein said index displayed in said fifth one of said frames includes columnar categories for each of said media files.

20. A computer readable medium as set forth in claim 19 wherein said index in said fifth one of said panes is sortable by each of said categories.

21. A computer readable medium as set forth in claim 20 further comprising displaying a plurality of heading buttons for each respective one of said categories for said index displayed in said fifth one of said panes wherein each of said heading buttons are selectable through said user interface to sort said index by said respective one of said categories.

22. A computer readable medium as set forth in claim 16 further comprising displaying a user selectable button in a selected portion of said frame wherein selecting of said button through said user interface causes a new user definable playlist to be added to said sources.

23. A computer readable medium as set forth in claim 15 wherein a second one of said sources includes a radio tuner.

24. A computer readable medium as set forth in claim 23 further comprising displaying in a fifth one of said panes an index of genre of said mediafiles when said radio button has been selected, said fifth one of said panes being displayed in lieu of said first, second and third ones of said panes.

25. A computer readable medium as set forth in claim 24 wherein said index displayed in said fifth one of said frames includes columnar categories for each of said media files.

26. A computer readable medium as set forth in claim 25 wherein said index in said fifth one of said panes is sortable by each of said categories.

27. A computer readable medium as set forth in claim 25 further comprising displaying a plurality of heading buttons for each respective one of said categories for said index displayed in said fifth one of said panes wherein each of said heading buttons are selectable through said user interface to sort said index by said respective one of said categories.

28. A computer readable medium as set forth in claim 23 further comprising displaying in said frame a user selectable refresh button when said radio tuner has been selected wherein selection of said refresh button connects a user computer to the Internet to obtain refreshed information for said media files.

29. A computer readable medium as set forth in claim 1 further comprising displaying in said frame a user selectable button wherein selection of said button develops a visual effect in said window in lieu of said panes.

30. A computer readable medium as set forth in claim 29 wherein said visual effect is developed responsive to at least one parameter of one of said media files while used by said media player.

31. A computer readable medium as set forth in claim 1 further comprising a search box disposed in a selected portion of said frame adapted to receive through said user interface successive characters of a search term.

32. A computer readable medium as set forth in claim 31 further comprising automatically searching said index upon entry of each one of said successive characters, and, in response to said searching being performed, refreshing said first one of said panes such that only selected ones of said media files in said index matching said successive ones of said characters are displayed.

33. A computer readable medium as set forth in claim 1 further including displaying a plurality of user selectable control buttons disposed in a selected portion of said frame, said control buttons controlling execution of said media player calling content from said media files in said index.

34. A computer readable medium as set forth in claim 33 wherein media player calls content from only user selected ones of said media files.

35. A computer readable medium as set forth in claim 33 further comprising displaying at least one user selectable slider in association with said control buttons, said slider controlling at least one parameter of content of said media files.

36. A computer readable medium as set forth in claim 33 further comprising displaying a status pane in a selected portion of said frame, said status frame displaying status of content of one of said media files when called by said media player.

37. A computer readable medium as set forth in claim 36 wherein a third one of said sources is a radio tuner.

38. A computer readable medium as set forth in claim 37 further comprising displaying in a fifth one of said panes an index of genre of said media files when said radio button has been selected, said fifth one of said panes being displayed in lieu of said first, second and third ones of said panes.

39. A computer readable medium as set forth in claim 38 wherein said index displayed in said fifth one of said frames includes columnar categories for each of said media files.

40. A computer readable medium as set forth in claim 39 wherein said index in said fifth one of said panes is sortable by each of said categories.

41. A computer readable medium as set forth in claim 39 further comprising displaying a plurality of heading buttons for each respective one of said categories for said index displayed in said fifth one of said panes wherein each of said heading buttons are selectable through said user interface to sort said index by said respective one of said categories.

42. A computer readable medium as set forth in claim 37 further comprising displaying in said frame a user selectable refresh button when said radio tuner has been selected wherein selection of said refresh button connects a user computer to the Internet to obtain refreshed information for said media files.

43. A computer readable medium as set forth in claim 42 wherein said refresh button changes state to a browse button when said library source is selected.

44. A computer readable medium as set forth in claim 43 wherein selecting said browse button through said user interface toggles said window between all of said panes being displayed and only a said first one and said fourth one of said panes being displayed.

45. A computer readable medium as set forth in claim 42 wherein said refresh button changes state to a bum CD button when said playlist is selected.

46. A computer readable medium as set forth in claim 45 wherein selecting said burn CD through said user interface initiates a further procedure allowing media files indicated in said selected playlist to be recorded onto a compact disk.

47. A computer readable medium comprising media player application code which implements the following procedures:
   generating in a user interface an application window having a window frame and a plurality of stiles to define a plurality of panes within said frame;
   displaying in a first one of said panes a user selectable index of a plurality of media files;
   displaying in a second one of said panes a user selectable index of a plurality of artists associated with said media files;
   displaying in a third one of said panes a user selectable index of a plurality of albums associated with said media files; and
   displaying a browse button in said frame wherein selecting said button through said user interface toggles said window between all of said panes being displayed and only a said first one of said panes being displayed.

48. A computer readable medium as set forth in claim 47 wherein selecting through said user interface one of said artists limits display of said index of said media files to selected ones of said media files associated with said one of said artists.

49. A computer readable medium as set forth in claim 47 wherein selecting through said user interface one of said albums limits display of said index of said media files to selected ones of said media files associated with said one of said albums.

50. A computer readable medium as set forth in claim 49 wherein said first one of said panes is displayed in said window in lieu of the other ones of said panes when said window is toggled to display only said selected one of said panes.

51. A computer readable medium as set forth in claim 47 wherein said index of said media files further includes a plurality of check boxes selectable through said user interface, each of said check boxes being associated with a respective one of each of said media files.

52. A computer readable medium as set forth in claim 51 further comprising displaying in a selected portion of said frame status information concerning said media files for which said associated one of said check boxes has been selected.

53. A computer readable medium as set forth in claim 47, wherein said stiles are movable in said window to change selectively through said user interface dimensions of said panes.

54. A computer readable medium as set forth in claim 47, wherein said index of said media files includes columnar categories for each of said media files.

55. A computer readable medium as set forth in claim 54, wherein said index of said media files is user sortable by each of said categories.

56. A computer readable medium as set forth in claim 55 further comprising displaying a plurality of user selectable heading buttons for each respective one of said categories wherein each of said heading buttons is selectable through said user interface to sort said index by said respective one of said categories.

57. A computer readable medium as set forth in claim 47 further comprising displaying in said frame a user selectable button wherein selection of said button develops a visual effect in said window in lieu of said panes.

58. A computer readable medium as set forth in claim 57 wherein said visual effect is developed responsive to at least one parameter of one of said media files while used by said media player.

59. A computer readable medium as set forth in claim 47 further comprising displaying a search box disposed in a selected portion of said frame adapted to receive through said user interface successive characters of a search term.

60. A computer readable medium as set forth in claim 59 further comprising automatically searching said index upon entry of each one of said successive characters, and, in response to said searching being performed, refreshing said first one of said panes such that only selected ones of said media files in said index matching said successive ones of said characters are displayed.

61. A computer readable medium comprising media player application code which implements the following procedures:

generating in a user interface an application window having a window frame and a plurality of stiles to define a plurality of panes within said frame;

displaying in a first one of said panes a user selectable index of a plurality of media files;

displaying in a second one of said panes first selected information for said media files;

displaying in a third one of said panes second selected information for said media files; and displaying in a fourth one of said panes information relating to a plurality of user selectable sources for said media files, wherein a first one of said sources is a library source and a second one of said sources is a user definable playlist, said library source when selected causes said first, second and said third ones of said panes to be displayed.

62. A computer readable medium as set forth in claim 61 further comprising adding selected ones of said media files to said playlist by dragging and dropping through said user interface from said index to an icon for said playlist in said fourth one of said panes.

63. A computer readable medium as set forth in claim 62 further comprising displaying in a fifth one of said panes an index of media files contained in said playlist when said playlist has been selected, said fifth one of said panes being displayed in lieu of said first, second and third ones of said panes.

64. A computer readable medium as set forth in claim 63 wherein said index displayed in said fifth one of said frames includes columnar categories for each of said media files.

65. A computer readable medium as set forth in claim 64 wherein said index in said fifth one of said panes is sortable by each of said categories.

66. A computer readable medium as set forth in claim 65 further comprising displaying a plurality of heading buttons for each respective one of said categories for said index displayed in said fifth one of said panes wherein each of said heading buttons are selectable through said user interface to sort said index by said respective one of said categories.

67. A computer readable medium as set forth in claim 61 further comprising displaying a user selectable button in a selected portion of said frame wherein selecting of said button through said user interface causes a new user definable playlist to be added to said sources.

68. A computer readable medium as set forth in claim 61, further comprising media player application code which implements the following procedures:

displaying in said frame a user selectable button wherein selection of said button develops a visual effect in said window in lieu of said panes.

69. A computer readable medium as set forth in claim 68 wherein said visual effect is developed responsive to at least one parameter of one of said media files while used by said media player.

70. A computer readable medium as set forth in claim 61, further comprising media player application code which implements the following procedures:

displaying a search box disposed in a selected portion of said frame adapted to receive through said user interface successive characters of a search term.

71. A computer readable medium as set forth in claim 70 further comprising automatically searching said index upon entry of each one of said successive characters, and, in response to said searching being performed, refreshing said first one of said panes such that only selected ones of said media files in said index matching said successive ones of said characters are displayed.

\* \* \* \* \*

UNITED STATES PATENT AND TRADEMARK OFFICE
CERTIFICATE OF CORRECTION

PATENT NO.      : 6,731,312 B2
DATED           : May 4, 2004
INVENTOR(S)     : Jeff Robbin It is certified that error appears in the above-identified patent and that said Letters Patent is hereby corrected as shown below:

Drawings
Sheet 1, Figure 1, reference number "40" should be -- 40a --; and the lead line for reference character "14" on the right side of each figure should point to the stile that extend horizontally to separate lower pane 26 from upper panes 30 and 34, rather than to the heading button 44c.
Sheet 10, Figure 10, the lead line for reference character "14" on the right side of each figure should point to the stile that extend horizontally to separate lower pane 26 from upper panes 30 and 34, rather than to the heading button 44c.

Column 1,
Line 6, change "graphic" to -- graphical --;
Line 8, change "medial" to -- media --;
Line 11, change "users" to -- user --;
Line 33, after "said" (first occurrence) insert -- panes --;
Line 43, change "te" to -- the --;

Column 4,
Line 43, change "88" to -- 48 --;

Column 6,
Lines 29 and 53, change "frames" to -- panes --;

Column 7,
Line 48, change "frames" to -- panes --;

Column 8,
Line 7, change "bum" to -- burn --;

UNITED STATES PATENT AND TRADEMARK OFFICE
CERTIFICATE OF CORRECTION

PATENT NO. : 6,731,312 B2
DATED : May 4, 2004
INVENTOR(S) : Jeff Robbin

It is certified that error appears in the above-identified patent and that said Letters Patent is hereby corrected as shown below:

Column 10,
Line 8, change "frames" to -- panes --.

Signed and Sealed this

Fourteenth Day of March, 2006

JON W. DUDAS
*Director of the United States Patent and Trademark Office*